United States Patent
Nash

(10) Patent No.: US 7,487,596 B2
(45) Date of Patent: Feb. 10, 2009

(54) LASER LINE PROJECTED ON AN EDGE OF A SURFACE

(75) Inventor: Derek J. Nash, Huntersville, NC (US)

(73) Assignee: Irwin Industrial Tool Company, Huntersville, NC (US)

( * ) Notice: Subject to any disclaimer, the term of this patent is extended or adjusted under 35 U.S.C. 154(b) by 133 days.

(21) Appl. No.: 10/876,909

(22) Filed: Jun. 25, 2004

(65) Prior Publication Data
US 2005/0283987 A1    Dec. 29, 2005

(51) Int. Cl.
G01C 15/00    (2006.01)
G01C 1/10    (2006.01)

(52) U.S. Cl. .............................. 33/290; 33/276; 33/286; 33/291; 356/148

(58) Field of Classification Search ................... 33/286, 33/290–291
See application file for complete search history.

(56) References Cited

U.S. PATENT DOCUMENTS

| | | |
|---|---|---|
| 1,153,760 A | 9/1915 | Butler |
| 1,308,809 A | 7/1919 | Reese |
| 1,971,189 A | 8/1934 | Leibing |
| 2,187,087 A | 1/1940 | Leary |
| 2,346,773 A | 4/1944 | McBride |
| 2,431,491 A | 11/1947 | Lee et al. |
| 2,600,857 A | 6/1952 | De La Mater |
| 2,759,696 A | 8/1956 | Nelson |
| 2,914,166 A | 11/1959 | Bihler |
| 3,278,843 A | 10/1966 | Deming |
| 3,576,409 A | 4/1971 | Fiddler |
| 3,628,874 A | 12/1971 | Tagnon |
| 3,635,565 A | 1/1972 | Colson |
| 3,648,835 A | 3/1972 | Yucel |
| 3,662,258 A | 5/1972 | Murphy |

(Continued)

FOREIGN PATENT DOCUMENTS

DE    3246359    6/1984

(Continued)

OTHER PUBLICATIONS

Sonin Laser Targeting Range Finder, www.sonin.com/lasertarget. html, Publication date unknown.

(Continued)

Primary Examiner—Minsun Harvey
Assistant Examiner—Phillip Nguyen
(74) Attorney, Agent, or Firm—Marshall, Gerstein & Borun LLP

(57) ABSTRACT

A laser reference device includes at least one planar or flat surface and an internal laser light source for generating a laser light beam. A lens inside the device may convert the laser light into a fan-shaped beam, and project the beam adjacent the planar or flat surface of the housing. The fan-shaped beam thus projects along that surface of the housing. If the laser leveling device is placed with the flat surface on a table or floor, for example, the fan-shaped beam will be in a level plane. This allows a user to place the laser leveling device on a surface and generate a laser light to align surfaces or objects, such as objects on a wall.

33 Claims, 10 Drawing Sheets

U.S. PATENT DOCUMENTS

| | | |
|---|---|---|
| 3,704,413 A | 11/1972 | Blevins |
| 3,713,614 A | 1/1973 | Taylor |
| 3,764,819 A | 10/1973 | Muller |
| 3,805,155 A | 4/1974 | Tsuda et al. |
| 3,820,903 A | 6/1974 | Kindl et al. |
| 3,836,848 A | 9/1974 | Blevins |
| 3,847,703 A | 11/1974 | Kaiser |
| 3,897,637 A | 8/1975 | Genho |
| 3,964,824 A | 6/1976 | Dixon |
| 4,041,382 A | 8/1977 | Washburn |
| 4,067,225 A | 1/1978 | Dorman et al. |
| 4,086,528 A | 4/1978 | Walton |
| 4,099,118 A | 7/1978 | Franklin et al. |
| 4,111,564 A | 9/1978 | Trice |
| 4,130,796 A | 12/1978 | Shum |
| 4,149,320 A | 4/1979 | Troyer et al. |
| 4,221,483 A | 9/1980 | Rando |
| 4,310,797 A | 1/1982 | Butler |
| 4,322,678 A | 3/1982 | Capots et al. |
| 4,351,113 A | 9/1982 | Eggertsen et al. |
| 4,439,927 A | 4/1984 | Elliott |
| 4,464,622 A | 8/1984 | Franklin et al. |
| 4,536,705 A | 8/1985 | Hayes |
| 4,639,666 A | 1/1987 | Strosser et al. |
| 4,676,100 A | 6/1987 | Eichberger |
| 4,686,454 A | 8/1987 | Pecukonis |
| 4,700,489 A | 10/1987 | Vasile |
| 4,751,782 A | 6/1988 | Ammann |
| 4,752,727 A | 6/1988 | Schneider |
| 4,766,673 A | 8/1988 | Bolson |
| 4,847,522 A | 7/1989 | Howard |
| 4,852,265 A | 8/1989 | Rando et al. |
| 4,853,617 A | 8/1989 | Douglas et al. |
| 4,854,704 A | 8/1989 | Funazaki et al. |
| 4,859,931 A | 8/1989 | Yamashita et al. |
| 4,868,910 A | 9/1989 | Maulding |
| 4,912,851 A | 4/1990 | Rando et al. |
| 4,939,455 A | 7/1990 | Tsugawa |
| 4,942,670 A | 7/1990 | Brandt |
| 4,947,116 A | 8/1990 | Welcome et al. |
| 4,988,192 A | 1/1991 | Knittel |
| 4,992,741 A | 2/1991 | Douglas et al. |
| 4,993,161 A | 2/1991 | Borkovitz |
| 5,012,590 A | 5/1991 | Wagner et al. |
| 5,023,484 A | 6/1991 | Pathak et al. |
| 5,033,848 A | 7/1991 | Hart et al. |
| 5,108,177 A | 4/1992 | Middleton |
| 5,144,487 A | 9/1992 | Hersey |
| 5,148,108 A | 9/1992 | Dufour |
| 5,182,863 A * | 2/1993 | Rando ................. 33/227 |
| 5,208,438 A | 5/1993 | Underberg |
| 5,243,398 A | 9/1993 | Nielsen |
| 5,264,670 A | 11/1993 | Leonard |
| 5,287,365 A | 2/1994 | Nielsen et al. |
| 5,287,627 A | 2/1994 | Rando |
| 5,317,253 A | 5/1994 | Kronberg |
| 5,352,974 A | 10/1994 | Heger |
| 5,367,779 A | 11/1994 | Lee |
| 5,394,616 A | 3/1995 | Claxton |
| 5,400,514 A | 3/1995 | Imbrie et al. |
| 5,406,441 A | 4/1995 | Warda et al. |
| 5,438,265 A | 8/1995 | Eslambolchi et al. |
| 5,457,394 A | 10/1995 | McEwan |
| 5,459,932 A | 10/1995 | Rando et al. |
| 5,481,809 A | 1/1996 | Rooney |
| 5,485,266 A | 1/1996 | Hirano et al. |
| 5,500,783 A | 3/1996 | Warda et al. |
| 5,524,352 A | 6/1996 | Rando et al. |
| 5,531,031 A | 7/1996 | Green |
| 5,533,268 A | 7/1996 | Keightley |
| 5,539,990 A | 7/1996 | Le |
| 5,541,727 A | 7/1996 | Rando et al. |
| 5,552,886 A | 9/1996 | Kitajima et al. |
| 5,555,137 A | 9/1996 | Whiting |
| 5,572,796 A | 11/1996 | Breda |
| 5,572,797 A | 11/1996 | Chase |
| 5,584,458 A | 12/1996 | Rando |
| 5,594,993 A | 1/1997 | Tager et al. |
| 5,604,987 A | 2/1997 | Cupp |
| 5,606,802 A | 3/1997 | Ogawa |
| 5,610,711 A | 3/1997 | Rando |
| 5,617,202 A | 4/1997 | Rando |
| 5,619,128 A | 4/1997 | Heger |
| 5,619,802 A * | 4/1997 | Rando et al. ................. 33/291 |
| 5,621,975 A | 4/1997 | Rando |
| 5,655,307 A | 8/1997 | Ogawa et al. |
| 5,666,736 A | 9/1997 | Wen |
| 5,666,737 A | 9/1997 | Rayan, III |
| 5,667,737 A | 9/1997 | Wittmann |
| 5,680,208 A | 10/1997 | Butler et al. |
| 5,689,330 A | 11/1997 | Gerard et al. |
| 5,742,387 A | 4/1998 | Ammann |
| 5,743,021 A | 4/1998 | Corcoran |
| 5,754,287 A | 5/1998 | Clarke |
| 5,754,582 A | 5/1998 | Dong |
| 5,773,971 A | 6/1998 | Tavernetti |
| 5,777,899 A | 7/1998 | Kumagai |
| 5,782,003 A | 7/1998 | Bozzo |
| 5,790,248 A | 8/1998 | Ammann |
| 5,812,057 A | 9/1998 | Hepworth et al. |
| 5,819,424 A | 10/1998 | Ohtomo et al. |
| 5,829,152 A | 11/1998 | Potter et al. |
| 5,836,081 A | 11/1998 | Orosz |
| 5,839,199 A | 11/1998 | Ogawa |
| 5,852,493 A | 12/1998 | Monnin |
| 5,864,956 A * | 2/1999 | Dong ................. 33/227 |
| 5,872,657 A | 2/1999 | Rando |
| 5,894,675 A * | 4/1999 | Cericola ................. 33/451 |
| 5,900,931 A | 5/1999 | Rando |
| 5,903,345 A | 5/1999 | Butler et al. |
| 5,907,907 A | 6/1999 | Ohtomo et al. |
| 5,917,314 A | 6/1999 | Heger et al. |
| 5,917,587 A | 6/1999 | Rando |
| D412,674 S | 8/1999 | Kaiser |
| 5,936,721 A * | 8/1999 | Ohtomo et al. ................. 356/138 |
| 5,946,087 A | 8/1999 | Kasori et al. |
| 5,950,321 A | 9/1999 | Pena et al. |
| 5,953,826 A | 9/1999 | Goodyer et al. |
| 5,967,645 A | 10/1999 | Anderson |
| 5,983,510 A | 11/1999 | Wu et al. |
| 5,991,102 A * | 11/1999 | Oono et al. ................. 359/820 |
| 5,992,029 A | 11/1999 | Dong |
| 5,994,688 A | 11/1999 | Jackson et al. |
| 6,000,813 A | 12/1999 | Krietzman |
| 6,005,716 A | 12/1999 | Ligtenberg et al. |
| 6,005,719 A | 12/1999 | Rando |
| 6,009,630 A * | 1/2000 | Rando ................. 33/365 |
| 6,012,229 A | 1/2000 | Shiao |
| 6,014,211 A * | 1/2000 | Middleton et al. ................. 356/250 |
| 6,023,159 A | 2/2000 | Heger |
| 6,028,665 A | 2/2000 | McQueen |
| 6,035,540 A | 3/2000 | Wu et al. |
| 6,037,874 A | 3/2000 | Heironimus |
| 6,043,879 A | 3/2000 | Dong |
| 6,065,217 A | 5/2000 | Dong |
| 6,067,152 A | 5/2000 | Rando |
| 6,067,722 A | 5/2000 | Goodyer et al. |
| 6,073,353 A | 6/2000 | Ghtomo et al. |
| 6,073,354 A | 6/2000 | Rando |
| 6,082,013 A | 7/2000 | Peterhans |
| 6,082,875 A | 7/2000 | Kousek |
| 6,101,728 A | 8/2000 | Keng |
| 6,104,479 A | 8/2000 | Ohtomo et al. |
| 6,163,969 A | 12/2000 | Jan et al. |

| | | |
|---|---|---|
| 6,178,649 B1 | 1/2001 | Wu |
| 6,178,655 B1 | 1/2001 | Potter et al. |
| 6,188,228 B1 | 2/2001 | Philipp |
| 6,195,902 B1 | 3/2001 | Jan et al. |
| 6,198,271 B1 | 3/2001 | Heger et al. |
| 6,202,312 B1 | 3/2001 | Rando |
| 6,211,622 B1 | 4/2001 | Bijawat et al. |
| 6,215,293 B1 | 4/2001 | Yim |
| 6,249,113 B1 | 6/2001 | Krantz et al. |
| 6,259,241 B1 | 7/2001 | Krantz |
| 6,313,912 B1 | 11/2001 | Piske et al. |
| 6,351,890 B1 | 3/2002 | Williams |
| 6,360,446 B1 | 3/2002 | Bijawat et al. |
| 6,363,622 B1 | 4/2002 | Stratton |
| 6,384,420 B1 | 5/2002 | Bozzo |
| 6,384,913 B1 | 5/2002 | Douglas et al. |
| 6,396,433 B1 | 5/2002 | Clodfelter |
| 6,427,347 B1 | 8/2002 | Butler |
| 6,449,856 B1 | 9/2002 | Matsumoto et al. |
| 6,452,097 B1 | 9/2002 | DeWall |
| 6,493,952 B1 | 12/2002 | Kousek et al. |
| 6,493,955 B1 | 12/2002 | Moretti |
| 6,502,319 B1 | 1/2003 | Goodrich et al. |
| 6,513,954 B2 | 2/2003 | Ebersole |
| 6,532,676 B2 | 3/2003 | Cunningham |
| 6,536,122 B2 | 3/2003 | Tamamura |
| 6,542,304 B2 | 4/2003 | Tacklind et al. |
| 6,546,636 B2 | 4/2003 | Tamamura |
| 6,568,094 B2 | 5/2003 | Wu |
| 6,593,754 B1 | 7/2003 | Steber et al. |
| 6,604,291 B2 | 8/2003 | Waibel et al. |
| 6,606,798 B2 | 8/2003 | El-Katcha et al. |
| 6,625,895 B2 | 9/2003 | Tacklind et al. |
| 6,637,124 B2 | 10/2003 | Pederson |
| 6,637,125 B2 | 10/2003 | Scarborough |
| 6,674,276 B2 | 1/2004 | Morgan et al. |
| 6,688,011 B2 | 2/2004 | Gamal et al. |
| 6,701,636 B2 | 3/2004 | Scarborough |
| 6,941,665 B1 * | 9/2005 | Budrow et al. ............... 33/286 |
| 6,964,106 B2 * | 11/2005 | Sergyeyenko et al. ......... 33/286 |
| 7,031,367 B2 * | 4/2006 | Marshall et al. ............. 372/109 |
| 7,121,010 B2 * | 10/2006 | Marshall et al. ............... 33/286 |
| 2001/0007420 A1 | 7/2001 | Bijawat et al. |
| 2001/0010460 A1 | 8/2001 | Miller et al. |
| 2001/0022035 A1 | 9/2001 | Veloce |
| 2001/0034944 A1 | 11/2001 | Cunningham |
| 2001/0049879 A1 * | 12/2001 | Moore, Jr. .................... 33/376 |
| 2001/0053313 A1 | 12/2001 | Luebke |
| 2002/0036768 A1 | 3/2002 | Feist et al. |
| 2002/0135347 A1 | 9/2002 | Morgan et al. |
| 2002/0162233 A1 | 11/2002 | El-Katcha et al. |
| 2003/0061720 A1 | 4/2003 | Waibel |
| 2003/0088993 A1 | 5/2003 | Baida |
| 2003/0101605 A1 | 6/2003 | Tacklind et al. |
| 2003/0101606 A1 | 6/2003 | Li |
| 2003/0106226 A1 | 6/2003 | Tacklind et al. |
| 2003/0110654 A1 | 6/2003 | Scarborough |
| 2003/0110655 A1 | 6/2003 | Scarborough |
| 2003/0110656 A1 | 6/2003 | Scarborough |
| 2003/0110657 A1 | 6/2003 | Scarborough |
| 2003/0145474 A1 | 8/2003 | Tacklind et al. |
| 2003/0177652 A1 | 9/2003 | Sawaguchi |
| 2003/0201783 A1 | 10/2003 | Steber et al. |
| 2003/0218469 A1 | 11/2003 | Brazell et al. |
| 2003/0229997 A1 | 12/2003 | Gamal et al. |
| 2003/0231203 A1 | 12/2003 | Raskin et al. |
| 2003/0231303 A1 | 12/2003 | Raskin et al. |
| 2004/0000918 A1 | 1/2004 | Sanoner et al. |
| 2004/0031163 A1 | 2/2004 | El-Katcha et al. |
| 2004/0172839 A1 * | 9/2004 | Zirk et al. ..................... 33/451 |
| 2004/0187327 A1 * | 9/2004 | Levine ......................... 33/286 |

FOREIGN PATENT DOCUMENTS

| | | |
|---|---|---|
| GB | 2131908 | 6/1984 |
| GB | 2 188 432 | 9/1987 |
| GB | 2345541 | 7/2000 |
| WO | WO 87/00933 | 2/1987 |
| WO | WO 94/04932 | 3/1994 |
| WO | WO 98/51994 | 11/1998 |
| WO | WO-98/58232 | 12/1998 |
| WO | WO-2004/113985 | 12/2004 |

OTHER PUBLICATIONS

Sonin Multi-Measure LD, www.sonin.com/measrueld.html, Publication date unknown.
Zircon DM S40, www.zircon.com, Publication date unknown.
Zircon DM S50, www.zircon.com, Publication date unknown.
Zircon DM S50L, www.zircon.com, Publication date unknown.
International Search Report in Application No. PCT/US2004/018724, dated May 9, 2005.
Written Opinion of the International Searching Authority in Application No. PCT/US2004/018724, dated May 9, 2005.
United Kingdom Search Report for United Kingdom Patent Application No. 0514904.2., dated Nov. 9, 2005.
International Search Report and Written Opinion of International Searching Authority issued in PCT/US2005/22804 mailed on May 31, 2006.

* cited by examiner

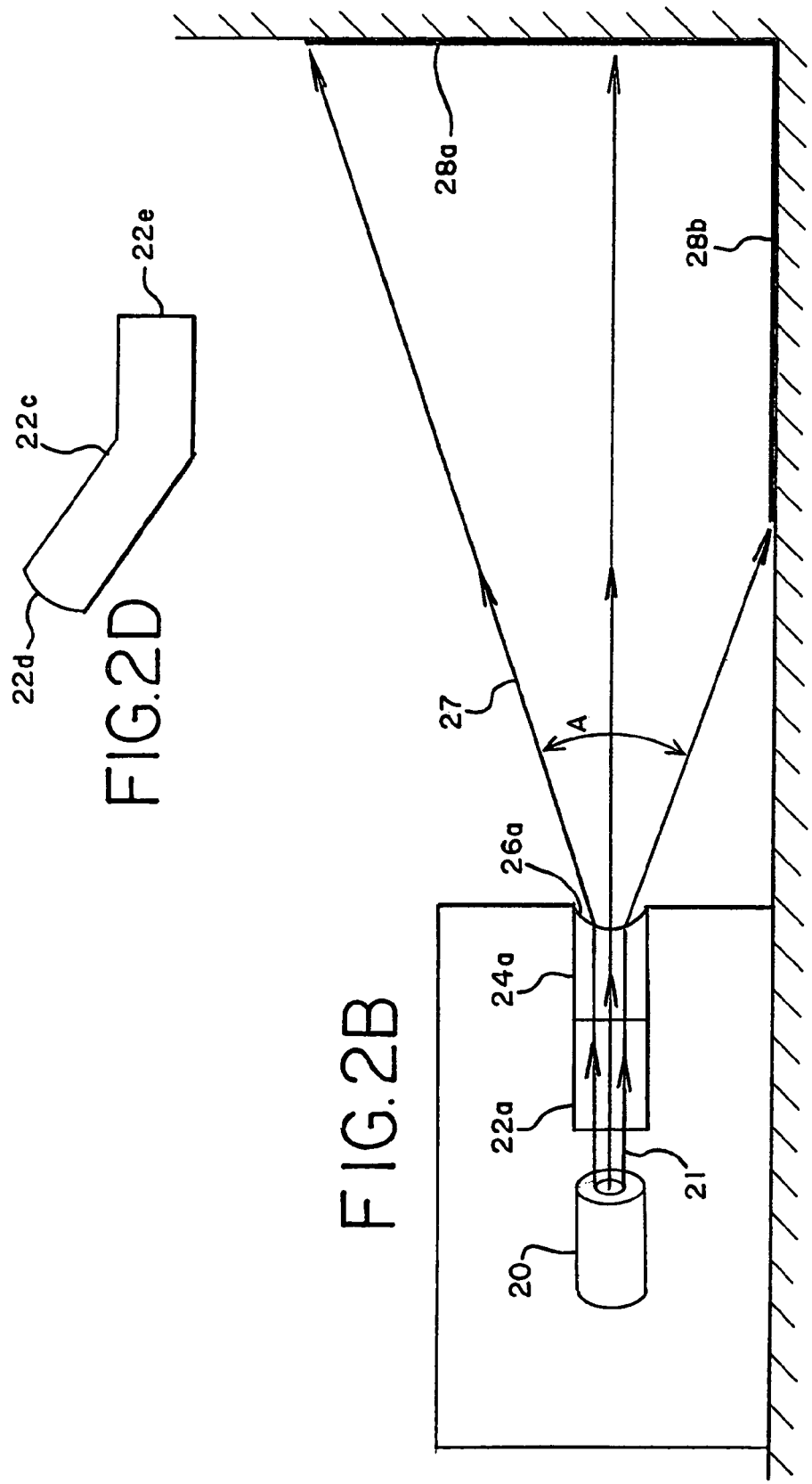

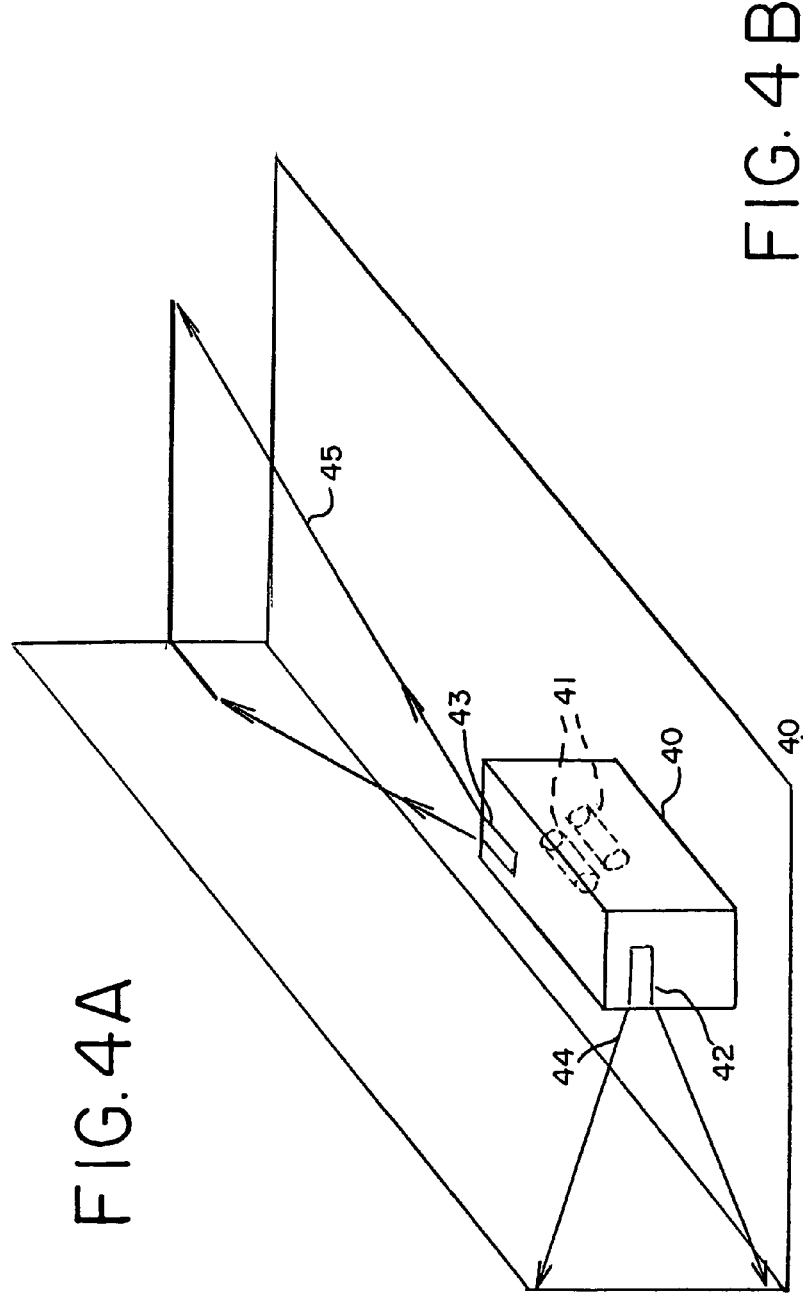

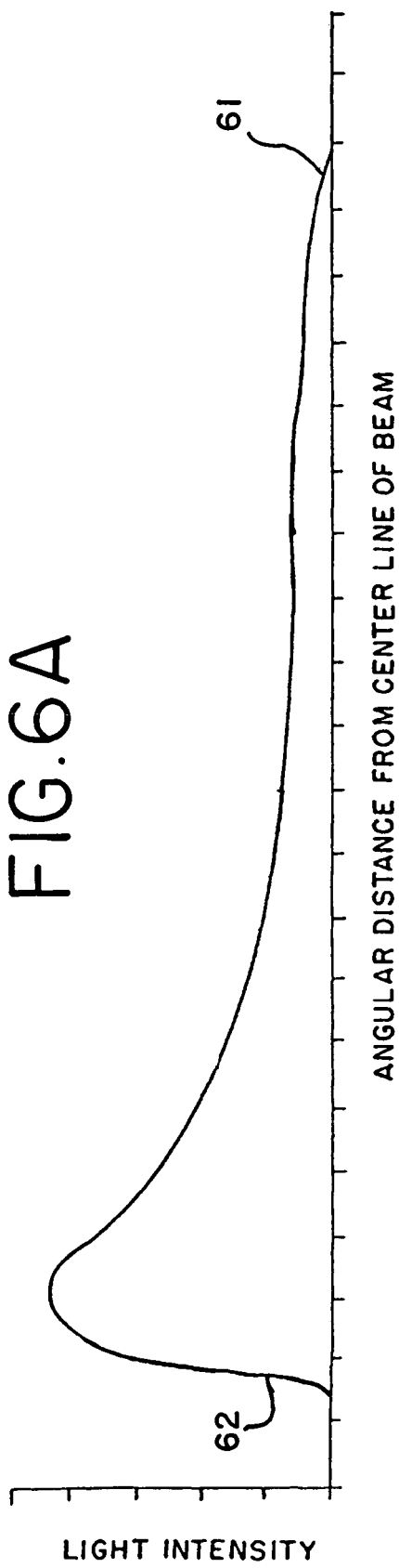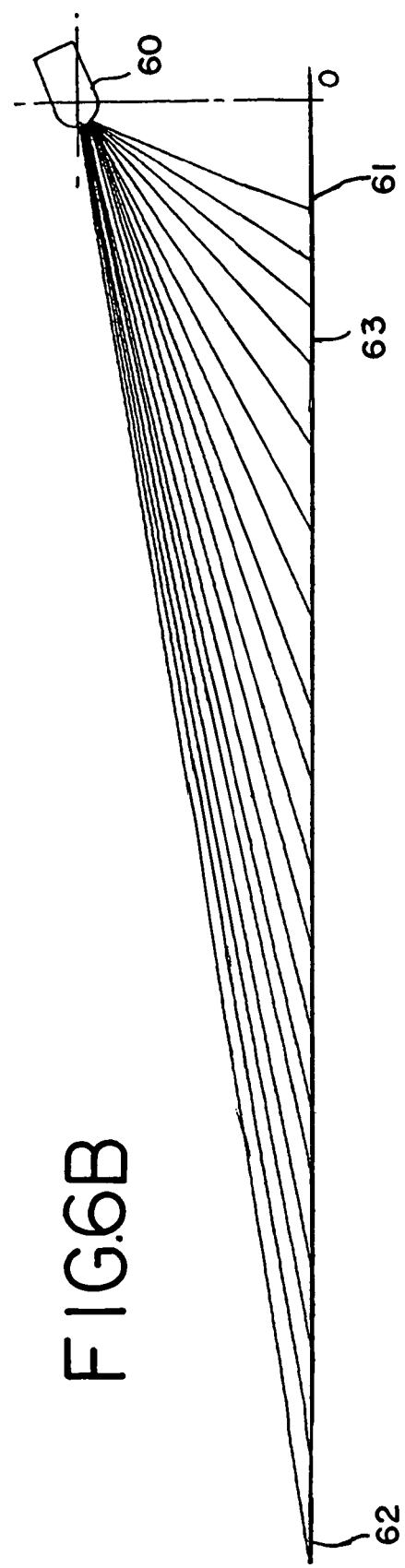

LASER LINE PROJECTED ON AN EDGE OF A SURFACE

TECHNICAL FIELD

The technical field of the application relates generally to measuring and aligning devices and specifically to laser measuring and aligning devices.

BACKGROUND

Alignment of surfaces is a perennial problem in a variety of fields, ranging from construction to interior decorating. Alignment is necessary for walls that should be perpendicular to a floor, or otherwise plumb. Masonry and brick-laying practitioners are well aware of the importance of plumbed and aligned surfaces and chalk lines. A home interior decorated with pictures and other wall ornamentation has a much better appearance when the ornamentation is aligned, especially with respect to vertical or horizontal alignment. Many mechanical and electrical alignment devices are available, including laser devices. Some of these products are cumbersome, others are not as useful as they could be. Chalk lines, for example, are undesirable for use in finished, interior areas.

Several aspects of alignment-product performance, and in particular of laser-alignment products, that could be improved are the width, brightness and straightness of the laser light. A visible, straight laser line may be limited in its brightness over a distance, and may also tend to defocus and become dimmer as a user works away from the source of the laser. Rotating lasers are used to project lines on walls perpendicular to the direction of propagation of the laser. Thus, such devices may have limited utility or may not work in confined spaces requiring a longer alignment tool.

Moreover, a conventional laser is not well-equipped for projecting a flat or planar beam of light. The essence of laser light is that it is coherent or substantially monochromatic, that is, of a single wavelength or a narrow wavelength band. Thus, when a beam of laser light is refracted through a prism, the prism output is not a spreading of the beam as with ordinary "white" light, but rather a coherent, focused beam, very similar to the input. The laser beam is thin and is only usefully visible when projected onto a surface.

Another aspect that could be improved is the inability of laser devices to work around obstructions. That is, if a wall-hanging, such as a picture frame, interrupts the laser beam, it may be blocked from further projection. Therefore, it is necessary to mark locations or heights, one by one, rather than working with the actual objects, in order to align them. Obstructions may include moldings placed in a doorway, picture frames in the way of those being aligned on one horizontal line, the operator of the device, other obstacles, or even textured or stuccoed surfaces on interior walls.

There are devices that direct a laser beam parallel to but away from a surface requiring alignment. A marker device or detector component is then used to sight the beam and mark corresponding locations on the wall adjacent the beam. Use of such a device requires multiple components and at least two people, one to align the laser and another to mark the wall.

Some laser devices attempt to use a laser light in combination with a reference surface, in order to place the laser light in the same plane with the reference surface. Thus, U.S. Pat. No. 5,604,987 incorporates a laser light in a carpenter's level, so that the laser light projects in the same plane as a surface of the level. However, this requires the level to have an interrupted surface, rather than a flat surface. An interrupted surface that is not flat cannot be used as a reference plane.

A conventional laser beam alignment tool is not able to project its laser light in the same plane as a surface of the alignment tool. It would be desirable to use a straight laser line or a planar beam of laser light in the same plane as a surface of the laser alignment tool.

BRIEF SUMMARY

One aspect of the invention is a laser reference device. The laser reference device includes a housing having a reference surface, a laser light generator mounted within the housing for generating laser light and projecting laser light outside the housing adjacent the reference surface. There is also an aiming device within the housing for adjusting a position of the laser light generator.

Another aspect of the invention is an aligning device. The aligning device includes a housing having two reference surfaces and a laser light generator mounted within the housing for generating laser light and projecting laser light outside the housing adjacent at least one of the reference surfaces. The device also includes an aiming device for adjusting a position or an angular orientation of a component of the laser light generator.

Another aspect of the invention is a method of making a laser aligning device. The method includes providing a housing having at least one planar surface, assembling a mirror into the housing, assembling a laser light source into the housing, and assembling an aiming device within the housing for aiming at least one of the mirror and the light source, wherein laser light reflected from the mirror leaves the aligning device adjacent the at least one planar surface.

Another aspect of the invention is a method of using a laser aligning device. The method includes placing the laser aligning device on a surface, and leveling at least one of the laser aligning device or the surface. The method also includes aiming the laser aligning device, and generating a beam of light adjacent a surface of the laser aligning device for aligning objects on another surface.

There are many ways to practice the present invention, as shown in the following drawings and specification. The embodiments are not meant to limit the invention, but rather to describe and illustrate a few of the many ways that the present invention may be used.

BRIEF DESCRIPTION OF THE DRAWINGS

FIG. 2b is a side view of the light source and lens of FIG. 2;

FIG. 2d is a top view of another lens embodiment;

FIG. 4a is a schematic view of another embodiment of an aligning tool with two laser light sources projecting two perpendicular fan-shaped beams;

FIG. 4b is a side view of an application in which a horizontal fan-shaped beam is used to detect high points on a surface;

FIGS. 6a and 6b depict the comet effect of useful embodiments;

DETAILED DESCRIPTION

Figure 1:
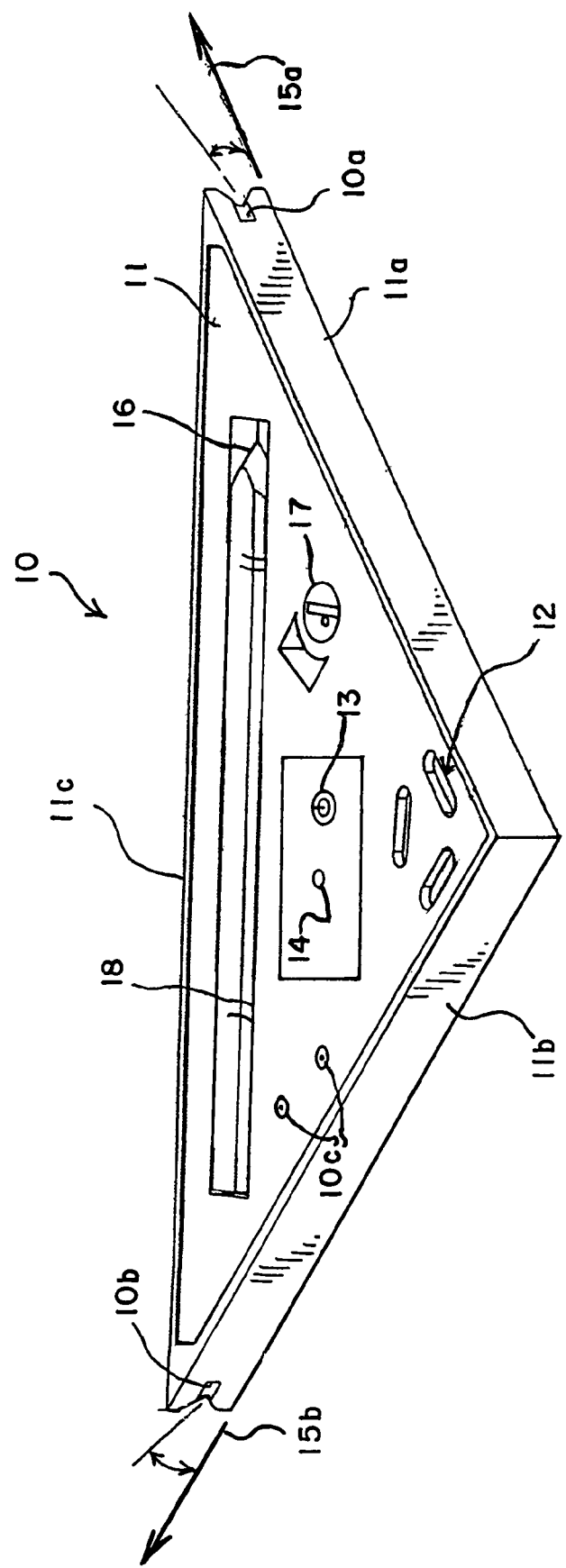
FIG. 1 is an embodiment of an aligning tool with two reference surfaces projecting laser light in planes adjacent to the planar surfaces.

Embodiments of the present invention overcome the above-mentioned difficulties and provide a virtual extension of a plane of a measuring or aligning device, by using a laser light that extends along an edge or flat surface of the measuring or aligning device. One embodiment of an aligning device according to the present invention is depicted in FIG. 1. A triangular aligning device 10, or "aligning square," includes two perpendicular flat surfaces 11a, 11b, and generates fan-shaped laser beams 15a, 15b. When the fan-shaped laser beams intersect with surfaces, such as walls or floors, a laser line is generated. Fan shaped laser beams 15a, 15b, are generated adjacent surfaces 11a, 11b.

Triangular aligning device 10 includes a housing 11, which may be made of molded plastic or metal, or other material that is suitably stiff and strong for use in alignment service. Housing 11 may include one or more bubble levels 12, preferably aligned parallel or perpendicular to the alignment surfaces 11a, 11b, of housing 11. The device may include a switch 13 for switching power from one or more batteries (not shown) to a laser light source. The switch may be a multi-position switch, enabling the user to turn on the desired light source, or to turn on or off each of the light sources.

The device may also include one or more on/off indicators 14, such as a light-emitting diode (LED), for indicating when the switch is in an ON position, enabling power from one or more batteries to reach the laser light source(s). When the power is on, laser light in the form of a fan 15a, 15b is projected adjacent to surfaces 11a, 11b of the aligning device. The light is virtually in the plane of surfaces 11a, 11b, allowing a user to virtually "project" an edge or surface of the device to a nearby wall or surface. Device 10 may also include a pencil 16, held onto the device with small grips 18, such as rubber or plastic grips, and may also include a pencil sharpener 17, machined, molded or assembled into the housing.

Aligning device 10 may be used by placing edge 11a or 11b flat onto a surface, such as a desk or a wall, and turning on a laser light source, enabling aligning device 10 to project light 15a or 15b, along an edge of surface 11a or 11b. The laser light may be in the shape of a fan-shaped beam, or alternatively, may also be in the shape of a line or "point" of light, rather than being spread into a fan shape. The "point" of light embodiment may allow the light to extend further, allowing the user to align objects many yards or meters away. Such embodiments will not shape the beam into a fan. The device may also be placed on its side, as shown, in FIG. 1, to project fan-shaped beams of light in two perpendicular planes.

Aligning device 10 includes at least one lens 10a, 10b, for shaping light, preferably laser light, from a laser light source along at least one of the planar surfaces 11a, 11b of the aligning device. Housing 10 is designed so that at least one lens 10a, 10b is very close to the planar surface. The light emerges from the lens near the visible surface and propagates in the direction of the lens in the plane of surfaces 11a and 11b. The aligning device may also have set screws or other adjusting devices 10c for aiming the laser aligning device.

Aligning device embodiments according to the present invention may use one or more laser light sources and lenses to generate, collimate, and reflect laser light in the manner desired. FIGS. 2a-2b depict an embodiment of an aligning device 25 with a laser light source 20 and an optical device 23. Laser light source 20 emits collimated laser light 21 which enters a planar surface 22a of optical device 23 and is also reflected from an aluminized or mirrored surface 23a of the optical device.

Optical device 23 may perform several functions, and may consist of several parts, such as a mirror or reflective surface 23a, a light pipe portion 22, a lens 24, and an exit surface 26. The configuration of optical device 23 and surface 23a may be such that total internal reflection results, with no light escaping except through exit surface 26. Lens 24 may convert the collimated laser light 21 into a fan-shaped beam. Light-pipe portion 22 transmits the reflected fan-shaped beam to lens 24 and exit surface 26, so that light beam 27 exits the optical device in a plane adjacent to reference surface 28. As the term is used here, an optical device may be any device used to transmit, reflect, focus or defocus light. A light pipe is any device that is used to transmit light, and may consist of any medium suitable for light transmission. The fan-shaped beam may subtend angle A as shown in FIG. 2b.

A laser source typically emits light in a generally ovate or elliptical form, with a major axis and a minor axis. A lens may convert the laser light into a fan-shaped beam. There are several lenses that will accomplish this, including at least one lens described in co-pending U.S. patent application Ser. No. 10/141,392, entitled "Laser Line Generating Device," which is hereby incorporated by reference in its entirety. Laser light in a flat, fan-shaped beam 27 leaves optical device 23 and is directed outward parallel to reference surface 28. Lenses used in embodiments for generating a fan-shaped beam may be plano-concave, bi-concave, plano-convex, cylindrical, or of other suitable configuration, so long as the beam leaves in the desired shape, i.e., a fan-shaped beam or a focused laser "point."

Aligning device 25 may also include devices 25a, 25b, for adjusting or aiming the laser source 20 and thus the direction of the light 27 emerging from laser source 20. Aligning devices shown include adjusting screws 25a and springs 25b. Any suitable and convenient adjusting devices may be used. For instance, with screws 25a, the angle of incidence $\theta_2$ of the laser light 21 onto mirror surface 23a may be adjusted, thus also adjusting the angle $\theta_1$ at which light is reflected from surface 23a and ultimately the angle of emergence from the optical device. This will adjust the direction of fan-shaped beam 27 as it leaves lens 26 and makes it possible to adjust or aim the beam. Adjusting devices may be used to adjust the mirror or the lens, or more than one of the laser source, the mirror and the lens.

FIG. 2b depicts a side view of laser light source 20 and lens with a mirror portion 22a and a lens portion 24a with a concave surface 26a. The concave surface converts the laser light into a flat, fan shaped beam. The divergence of the beam, represented by the angle A, is controlled by the lens. The plane of the beam may be adjacent and to the reference surface 28. As shown in darker lines in FIG. 2b, a laser line is generated where the fan-shaped beam intersects a surface, such as wall 28a or floor 28b.

Figure 2C:
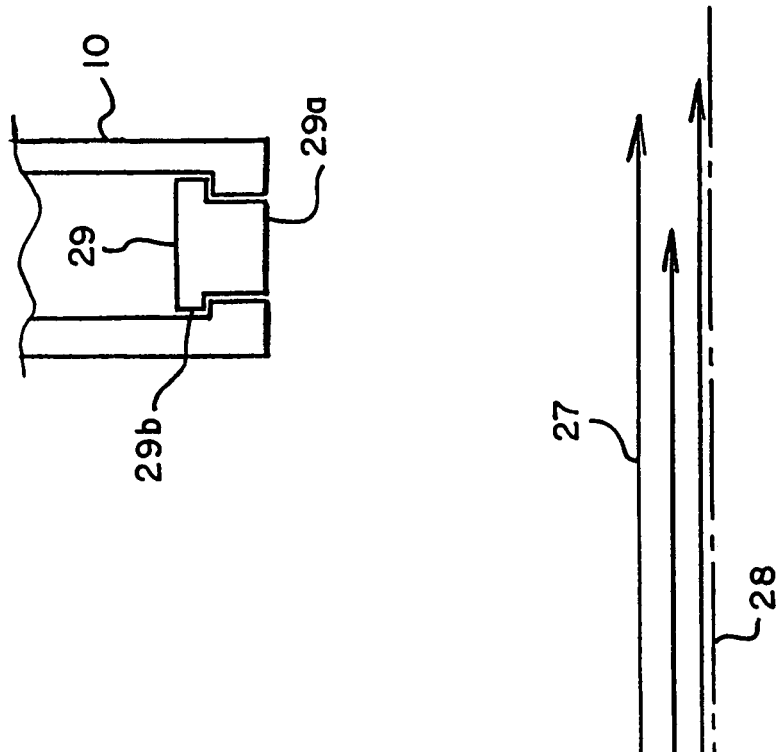
FIG. 2c is a partial elevational view of a lens in a housing.
Figure 2A:
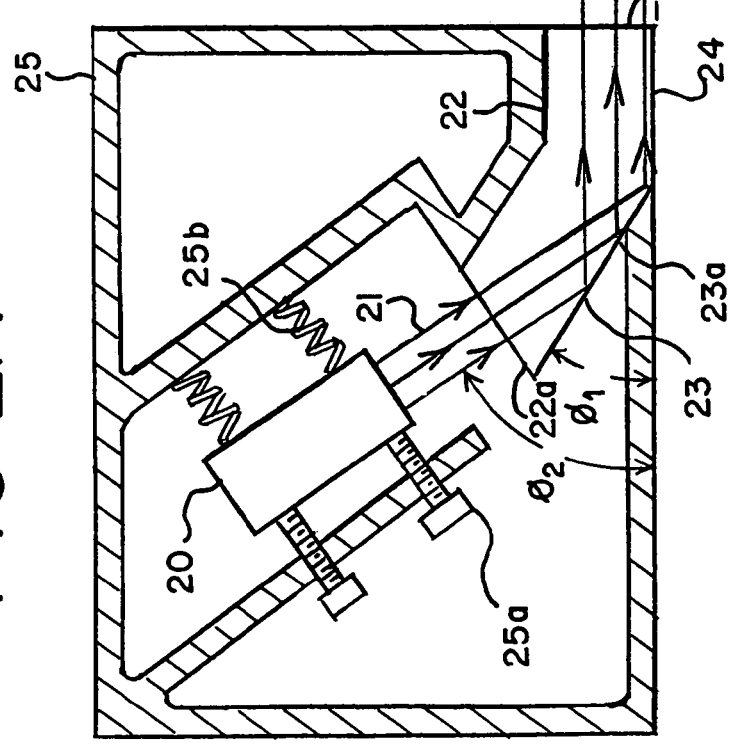
FIG. 2a is a top view of an embodiment of a light source and a lens.

One geometry that may minimize the difference between the bottom of the lens and the surface of the planar edge is depicted in FIG. 2c, in which lens 29 has an exit surface 29a in the plane of the reference surface and is retained in the aligning tool with lips 29b, preferably machined into the lens. This is the configuration of the lens in the housing that is preferred for the embodiment of FIGS. 2a and 2b. FIG. 2d depicts another lens that may be used, this lens 22c having a concave inlet face 22d and a planar exit face 22e. A variety of lenses may be used in the aligning device.

In other embodiments, an aligning device may simply reflect and bend a beam of laser light. As is well known to those skilled in the laser arts, laser light sources are available in which the light is emitted in a round or an elliptical shape. Thus, the aligning device may work with a light source that is either round or elliptically shaped. The lens may have a cylindrical component, or a concave or a convex component, that converts the laser light into a fan shaped beam. Alternatively, the aligning device may include only a mirror that directs the laser light along a plane adjacent to a reference surface. In other embodiments, the aligning device may have a separate mirror and lens for reflecting the light and then converting the light to a fan-shaped beam.

Figure 2E:
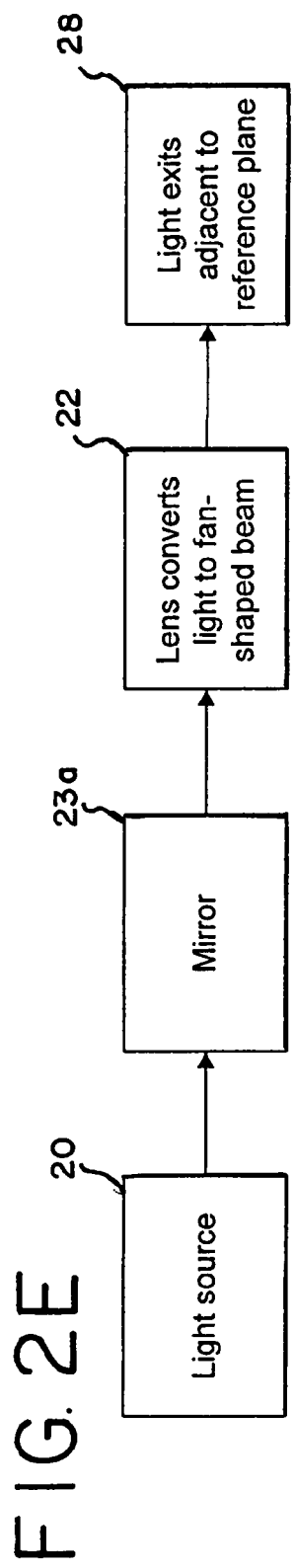
FIGS. 2e-2g are schematic views of further embodiments of aligning devices.
Figure 2F:
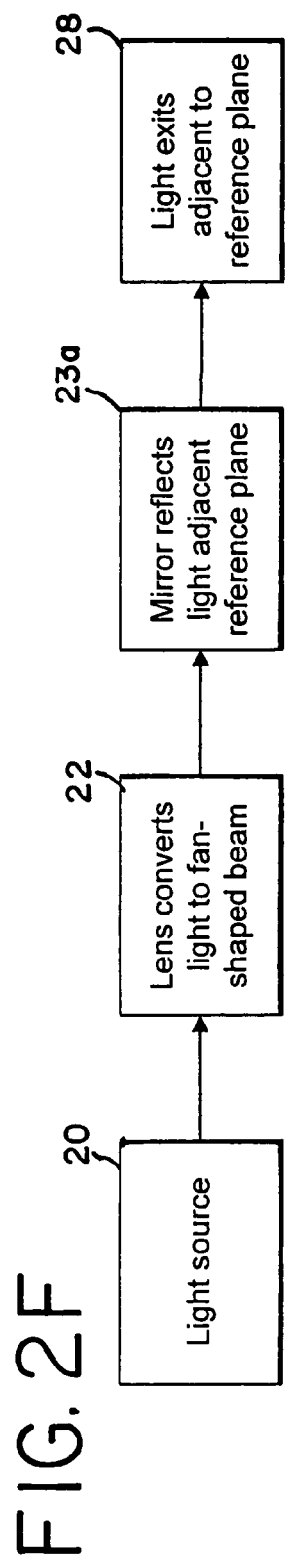
Figure 2G:
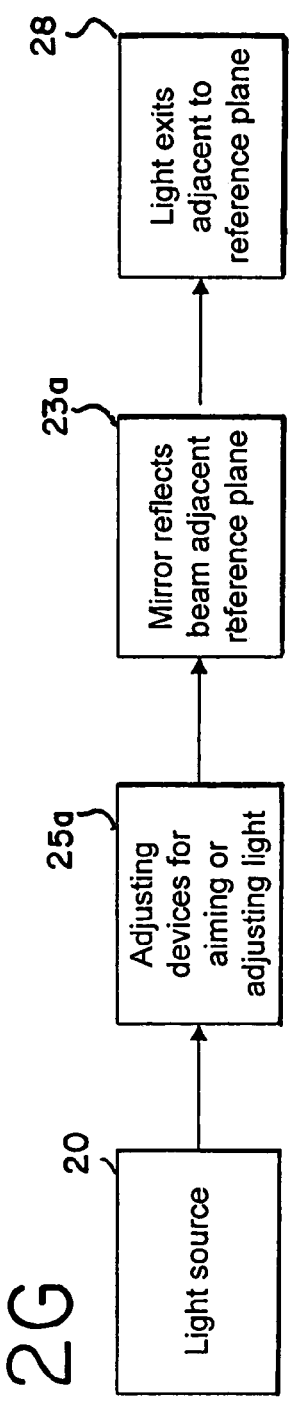

FIGS. 2e through 2g are schematic views of other possible embodiments of aligning devices using different serial arrangements of components. FIG. 2e, for instance, includes a light source 20, a mirror 23a, and a lens 22 which converts the reflected light into a fan-shaped beam before the light exits the aligning device adjacent a reference surface or plane 28. In this instance, the lens may be at the exit surface of the aligning device, rather than well inside the aligning device. FIG. 2f depicts another embodiment, in which the light source 20 emits laser light which is then converted into a fan shaped beam by a lens 24. The fan-shaped beam is then reflected by a mirror 23a before it leaves the housing of the aligning device, the light in a plane or fan-shaped beam adjacent the reference surface or reference plane. FIG. 2g depicts another embodiment in which the laser light is not converted to a fan-shaped beam, but remains as a circular or elliptically shaped beam of light. In this embodiment, adjusting devices 25a adjust the light source 20 or a mirror 23a which reflects the beam of light before the light leaves the aligning device adjacent the reference plane 28. Other embodiments are also possible.

Figure 3A:
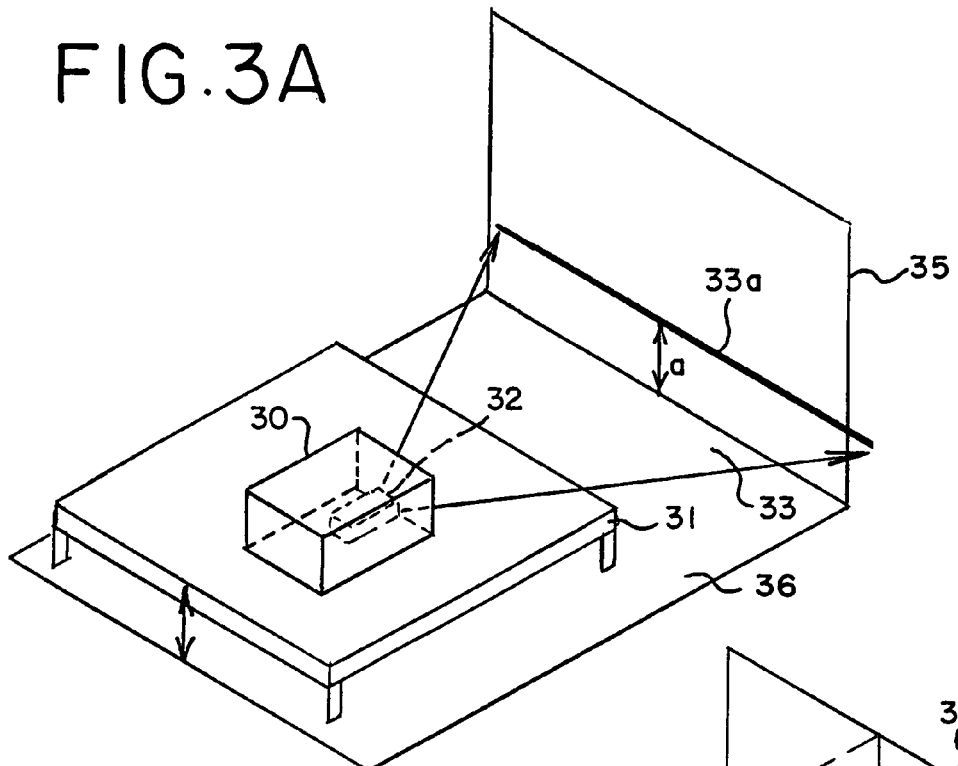
FIGS. 3a and 3b depict an embodiment of an aligning tool projecting a fan-shaped beam of light onto nearby horizontal and vertical surfaces.
Figure 3B:
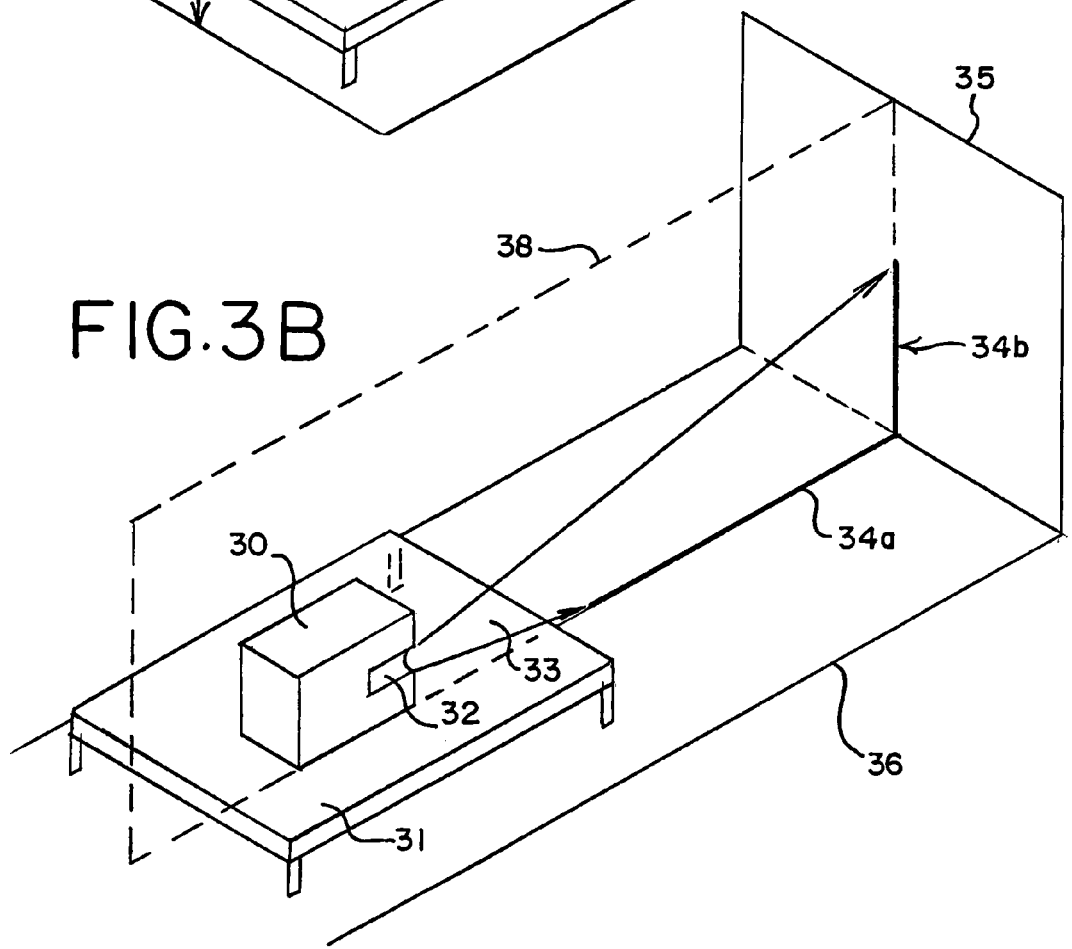

FIGS. 3a-3b depict an aligning device with a single laser light source and lens placed on a horizontal surface, such as a table or work-bench, such that the light leaves the lens in a horizontal or vertical fan-shaped beam. FIGS. 3a and 3b depict an aligning device 30 on surface 31 using a laser light source and a lens 32 to generate a fan-shaped beam 33. As shown in FIG. 3a, aligning device 30 generates the fan-shaped beam 33 in a horizontal plane parallel to and adjacent a reference surface, such as table surface 31. Fan-shaped beam 33 may also be parallel to another reference surface, such as floor 36. When fan-shaped beam 33 intersects wall 35, a visible line 33a may be generated, in this case in a horizontal plane. Ideally, if the table top is a distance "a" from the floor, the laser beam projects along the plane of the top of table 31 and is also a distance "a" from the floor (if the table surface is parallel to the floor).

In FIG. 3b, fan shaped beam 33 intersects the surface 31 on which aligning device 30 has been placed, and the beam also intersects floor 36, generating visible line 34a. The remainder of the fan shaped beam projects further until it intersects wall 35 or other surface on which vertical alignment is desired, generating visible line 34b. Beam 33 is adjacent reference surface 38. Aligning device 30, with a single light source and lens, may be somewhat smaller in size than the aligning device 10 depicted in FIG. 1.

It will be understood that many other embodiments of aligning devices using the principles demonstrated in FIGS. 1, 2a-2d, and FIGS. 3a-3b. For instance, as shown in FIG. 4a, an aligning device 40 may have multiple laser light sources 41 to generate laser light and multiple lenses 42, 43 to focus or direct the light as desired into more than one light beam 44, 45 directed to more than one reference plane. In this embodiment, fan-shaped beam 44 emerges in a vertical plane that is perpendicular to fan-shaped beam 45 which emerges in a horizontal plane. With proper orientation between reference surfaces, alignment may then take place in two planes simultaneously, e.g., on two walls, or on a wall and a floor or a ceiling. The "speed-square" device depicted in FIG. 1 is one example of a device using two laser light sources and projecting two laser beams. As shown in FIG. 4b, a fan-shaped beam 45 may be generated by the aligning device 40 in a horizontal plane and used to detect high points on a surface. The surface may be a concrete floor or other surface in which leveling is desired. High points may then be leveled or smoothed out as desired.

The lenses used to focus and reflect laser light, and to generate a fan-shaped beam, are well known and need not be repeated here. For instance, cylindrical lenses are described in U.S. Pat. Nos. 3,854,820, 4,123,148, 4,901,207, 5,363,469 and U.S. Pat. No. 5,446,635, the disclosures of all of which are hereby incorporated by reference. These patents discuss a variety of lenses useful in reflecting light and in generating fan-shaped beams useful in aligning devices. Such lenses may also be useful in embodiments of the present invention.

Figure 5A:
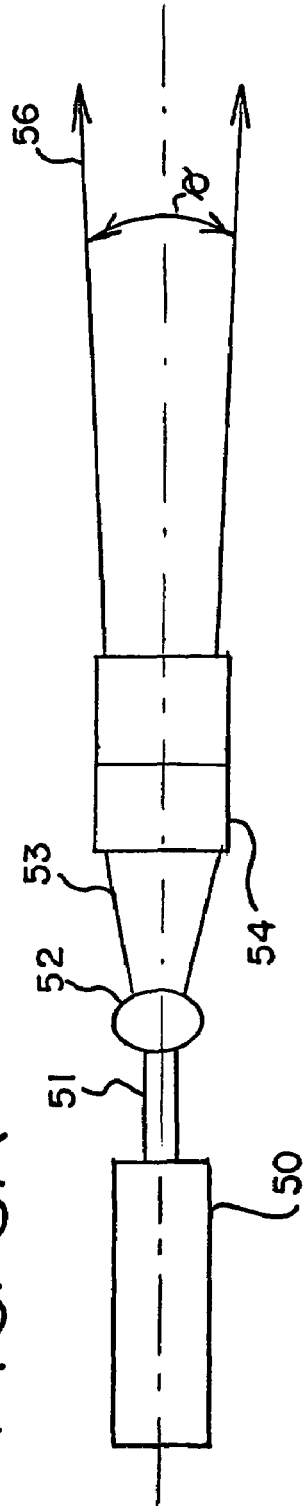
FIG. 5a is a top view of another embodiment of an aligning tool with a light source, and a lens projecting a fan-shaped beam adjacent to one surface.
Figure 5B:
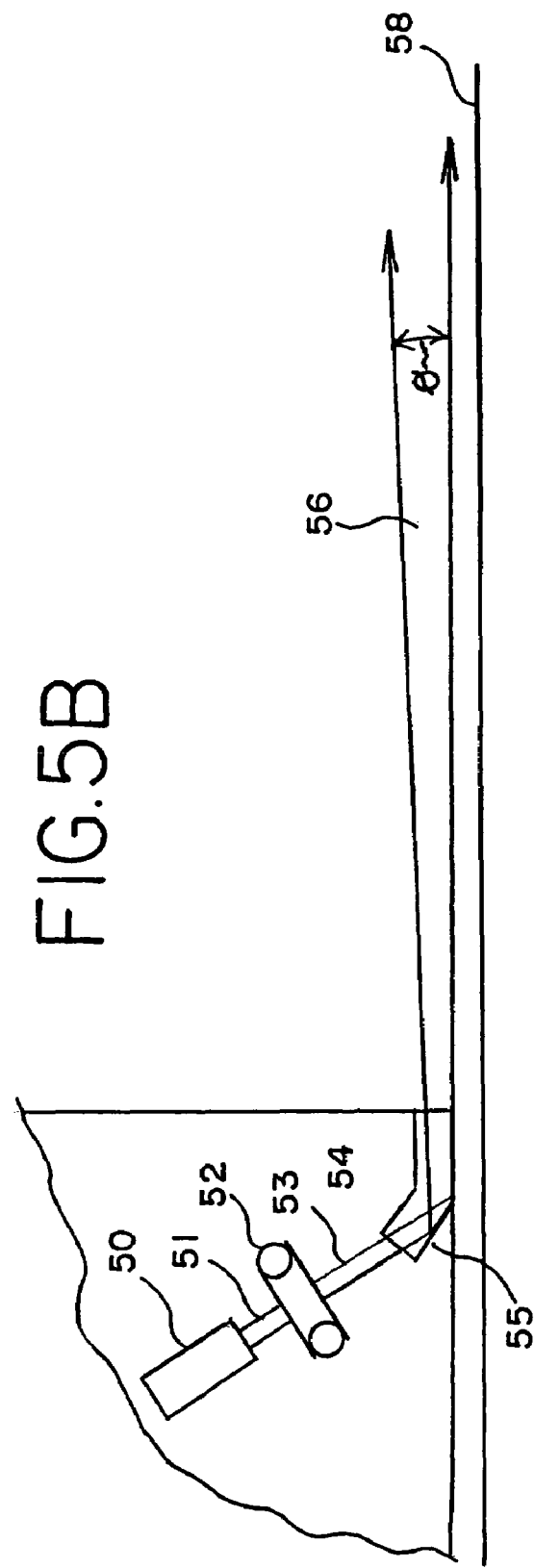
FIG. 5b is a side view of another embodiment of an aligning tool with a light source, a cylindrical lens and a reflecting lens, projecting a fan-shaped laser beam along one surface.

FIGS. 5a and 5b depict an embodiment in which a cylindrical lens 52 receives light 51 from a laser light source 50. Light leaves the cylindrical lens 52 as a fan-shaped beam 53 and is then reflected by a mirrored surface 55 of mirror 54. The light leaves as a fan shaped beam 56, and if mirror 54 is placed properly near the bottom surface of an aligning device, the fan-shaped beam may be virtually in the plane of surface 58 which holds the aligning device. Surface 58 may be a horizontal or vertical aligning device. Top view FIG. 5a depicts planar, fan-shaped beam 56 diverging at angle $\theta_3$. Side view FIG. 5b depicts light beam 56 aimed a horizontal angle $\theta_4$ away from parallel with reference surface 58 to compensate for the divergence. The "speed-square" of FIG. 1, or other embodiments, may be constructed with cylindrical lenses.

One property of cylindrical lenses useful in aligning devices is that the light may emerge with a "comet effect," in which the intensity of the light is greatest nearer one edge of the beam than the other. This effect is discussed in detail in U.S. Pat. No. 5,967,645, the entire contents of which are hereby incorporated by reference in their entirety. In aligning devices, the edge with the fainter light may be used on the "nearer" edge of the wall or surface on which alignment is desired, and the brighter light may be used on the "farther" edge of the wall. The comet effect arises because of the variation of intensity with the angle of incidence of the light with a surface.

The comet effect is depicted in FIGS. 6a and 6b. In FIG. 6a, the intensity of light in one-half of a fan-shaped beam is depicted, with light at a low angle having a great intensity 62, and light and a greater angle having a lesser intensity 61. The other half of the beam has a symmetrical distribution of light intensity with angle of incidence. In FIG. 6b, aligning device 60 emits aligning light onto wall 63 at a variety of angles, including lower angle 62 with a greater intensity at a distance from aligning object 60, and at a lesser intensity 61 at a lesser distance from the aligning object. The "comet effect" is thus useful in allowing the laser light to be useful at greater distances from the aligning object.

Figure 7A:
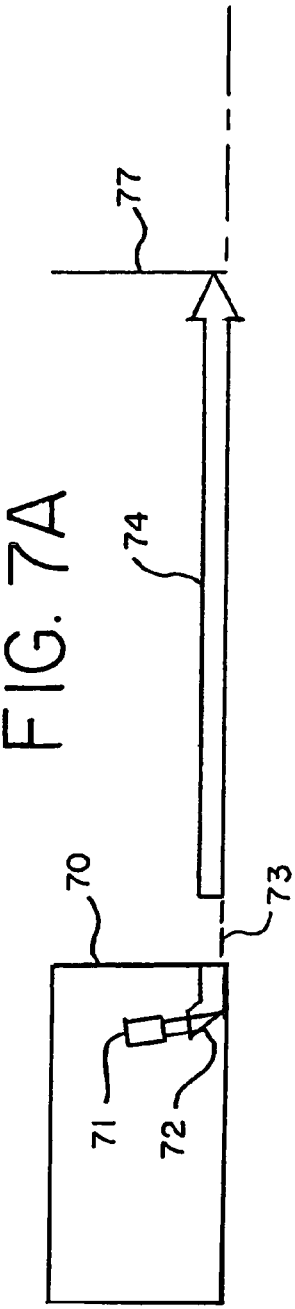
FIGS. 7a-7c depict the divergence of the laser beam and compensation for divergence in embodiments of the present invention.
Figure 7B:
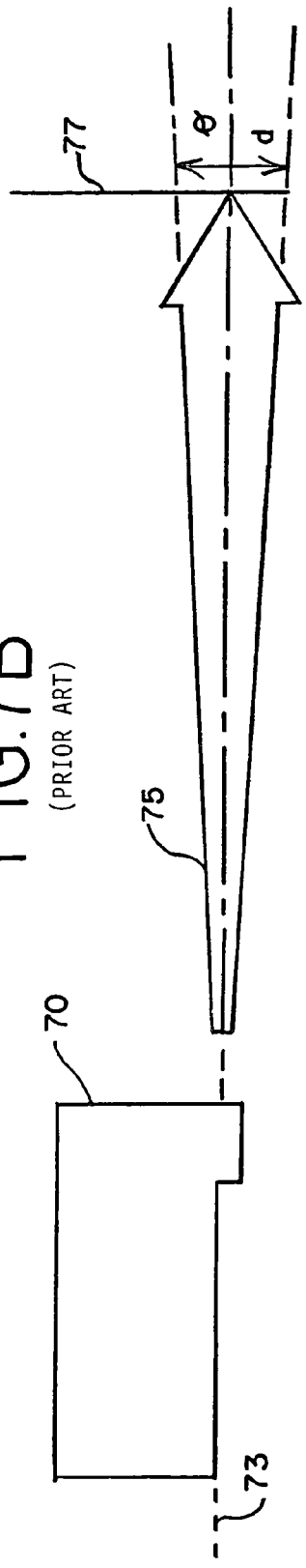
Figure 7C:
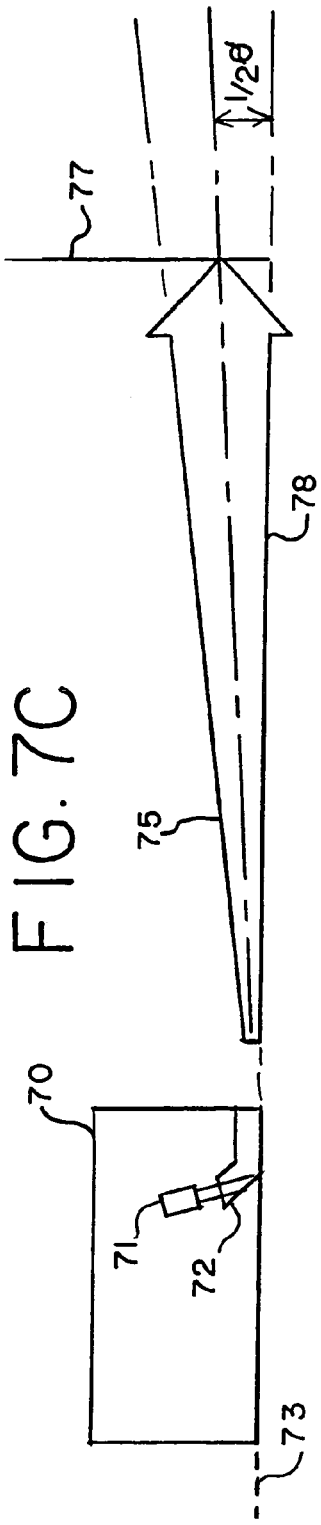

Aligning devices using light have contradictory requirements: the light intensity, as seen above in the discussion of the comet effect, diminishes with distance, while users wish for the aligning device to be useful at a considerable distance. This dichotomy is explored in FIGS. 7a-7c, and in the discussion that concerns these figures. FIGS. 7a-7c depict views of a laser aligning device, in which divergence of the laser beam over distance is exaggerated for the sake of clarity. Top view FIG. 7a depicts an ideal laser beam in a vertical plane with no horizontal divergence after it leaves the laser aligning device 70. Laser light source 70 generates laser light which is collimated and focused and emerges from lens 72 adjacent reference plane or surface 73. When the laser light emerges, it is focused into a narrow plane along the minor axis of generation of the laser light. In the ideal situation depicted in FIG. 7a, laser light beam 74 does not diverge and maintains the same very narrow planar focus as it traverses from the aligning device to a surface 77 of interest to a user.

A more realistic situation is depicted in FIG. 7b in a top view of a prior art laser device 79. The laser light, which is in a vertical plane, diverges horizontally by some small angle, θ, as it traverses the distance from the aligning device 70 to surface 77. The angle of divergence results in the laser beam having a thickness d when the laser light intersects surface 77 and generates a visible line of light on the surface. Thickness d may be considered a measure of the error caused by the divergence of the beam. The user now must guess where to mark the wall or other surface of interest, or alternatively, which portion of the beam to use for aligning purposes.

The present invention helps to overcome this difficulty by aiming the aligning device using the aiming or adjusting features mentioned above with regard to FIG. 2a. As shown in FIG. 7c, fan-shaped beam 75 may be aimed so that its edge 78 will intersect surface 77 at the desired aiming point. If the angle of divergence in the plane of the fan-shaped beam 75 is θ, then an adjustment in aim of about one-half θ will move beam 75 sufficiently to place edge 78 onto surface 77 at the desired aiming point. In this manner, a user may more accurately aim the laser aligning device to compensate for beam divergence. The user may then mark the surface or otherwise use the laser light at its edge rather than guessing for the center of the beam. Laser light may be thus generated adjacent reference surface 73.

Figure 8:
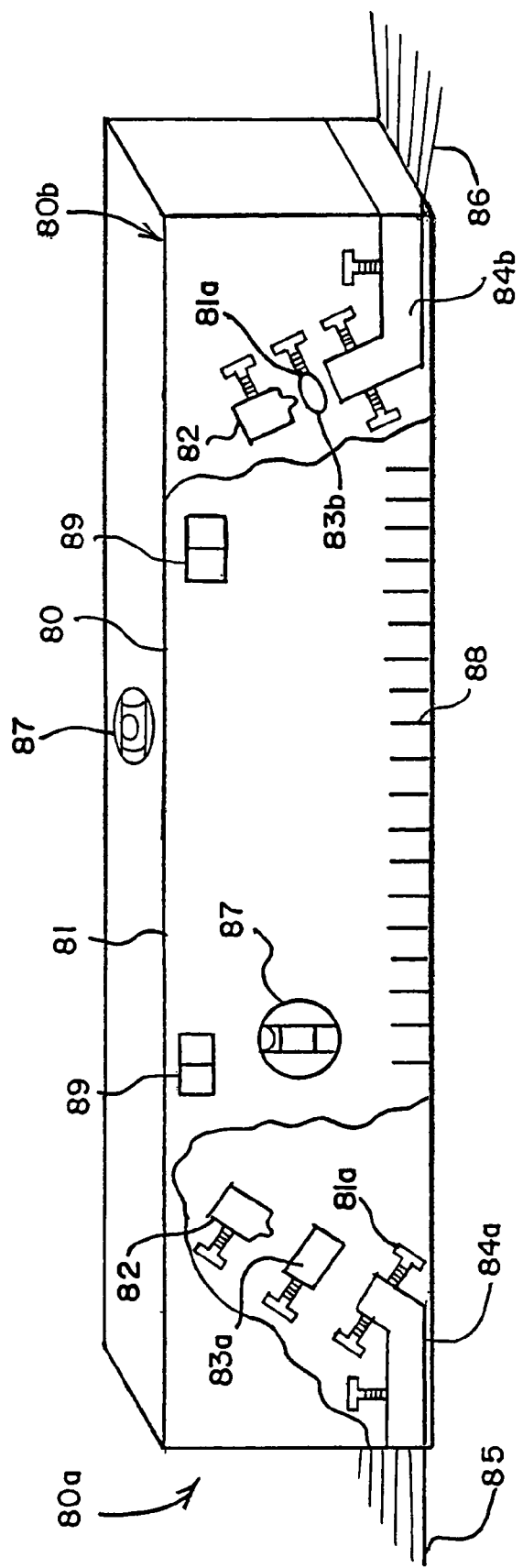
FIG. 8 depicts another embodiment of an aligning device with two laser systems in the same plane.

Another embodiment of an aligning device is depicted in FIG. 8. A carpenter's level aligning tool 80 may include a housing 81 and two laser alignment systems acting in different directions in the same plane. The tool 80 may also include one or more spirit levels 87 and measuring markings 88. A first laser alignment system 80a may include a laser light source 82 and a lens 83a for focusing the laser light. Lens 83a does not convert the light into a planar beam, but rather focuses the light into a tight laser "point." When the laser light from this system emerges from the carpenter's level aligning tool 80, the light is in the form of a thin laser beam or "point" 85. This system includes an optical device such as a reflecting lens or mirror 84a for reflecting the light into a thin laser beam 85 in a horizontal plane. This system also includes a first switch 89 for connecting a power source (not shown) to the laser light source. The power source may be one or more batteries, or any other suitable power source.

Aligning tool 80 includes a second laser alignment system 80b that also includes a laser light source 82, a second switch 89, and may include a lens 83b for converting the laser light into a planar beam. The light may then be reflected by optical device 84b, which may be a mirror or a lens or both. Thus, aligning tool 80 may use a planar beam 86 in one direction, and may use a single "point" of light 85 in another direction, which may be 180° from the direction of planar beam 86. One switch may be used in place of two switches if desired. Adjusting or aiming devices 81a may be used to align one or more of the light source 82, lenses 83a, 83b, and optical devices 84a, 84b. These devices may include, among others, a set screw, a thumbscrew, a cam with a corresponding movement on the optical device, a spring, or any other suitable adjusting device.

It is intended that the foregoing detailed description be regarded as illustrative rather than limiting, and that it be understood that it is the following claims, including all equivalents, that are intended to define the spirit and scope of this invention. It will be understood that no limitation of the scope of the invention is intended by the above description and drawings, which is defined by the claims below.

What is claimed is:

1. A laser reference device disposable on a working surface, comprising:
    a housing having an outer reference surface that defines a reference plane;
    a laser light generator mounted within the housing for generating laser light and projecting a fan-shaped laser light beam outside the housing immediately adjacent and substantially parallel to the reference surface; and
    an aiming device for adjusting a position of the laser light generator,
    wherein the reference surface is located immediately adjacent the working surface when the device is placed on the working surface, and the laser light beam projects substantially parallel and immediately adjacent to the working surface.

2. The device of claim 1, wherein the laser light generator comprises a laser light source and an optical device.

3. The device of claim 1, wherein the laser light generator comprises a laser light source and a lens.

4. The device of claim 1, wherein the laser light generator comprises a cylindrical lens.

5. The device of claim 1, wherein the aiming device is positioned for aiming at least one of a laser light source, a mirror and a lens.

6. The device of claim 1, wherein the housing comprises a second reference surface perpendicular to the reference surface.

7. The device of claim 6, wherein laser light beam is generated adjacent the second reference surface.

8. The device of claim 1, wherein the laser light is from about 625 nm to about 650 nm.

9. The device of claim 1, further comprising a switch for switching on and off a power source for the laser light source.

10. The device of claim 1, wherein the housing is in the shape of a triangle and further comprising a planar surface perpendicular to the reference surface, wherein laser light exits the device adjacent the planar surface.

11. The device of claim 1, wherein the laser light generator comprises a laser light source and a mirror.

12. The device of claim 1, further comprising at least one level indicator.

13. A laser reference device disposable on a working surface, the device comprising:
    a housing having a reference surface;
    a laser light generator mounted within the housing for generating laser light and projecting a fan-shaped laser light beam outside the housing immediately adjacent and substantially parallel to the reference surface;

an aiming device for adjusting a position of the laser light generator; and at least one of a pencil and a pencil sharpener mounted on the device, wherein the reference surface is located immediately adjacent the working surface when the device is placed on the working surface, and the laser light beam projects substantially parallel and immediately adjacent to the working surface.

14. An aligning device disposable on a working surface, the device comprising:

a housing having two outer reference surfaces that define two reference planes;

a laser light generator mounted within the housing for generating laser light and projecting a fan-shaped laser light beam outside the housing immediately adjacent and substantially parallel to at least one of the reference planes; and an aiming device for adjusting a position or an angular orientation of a component of the laser light generator, wherein the at least one reference surface is located immediately adjacent the working surface when the device is placed on the working surface, and the laser light beam projects substantially parallel and immediately adjacent to the working surface.

15. The aligning device of claim 14, wherein the laser light generator comprises a laser light source and an optical device.

16. The device of claim 14, wherein the laser light generator comprises a laser light source and at least one of a lens and a mirror.

17. An aligning device disposable on a working surface, the device comprising:

a housing having two reference surfaces;

a laser light generator mounted within the housing for generating laser light and projecting a fan-shaped laser light beam outside the housing immediately adjacent and substantially parallel to at least one of the reference surfaces;

an aiming device for adjusting a position or an angular orientation of a component of the laser light generator; and at least one of a pencil and a pencil sharpener mounted on the housing, wherein the at least one reference surface is located immediately adjacent the working surface when the device is placed on the working surface, and the laser light beam projects substantially parallel and immediately adjacent to the working surface.

18. The aligning device of claim 14, wherein the reference surfaces are perpendicular, and wherein laser light is distributed adjacent both surfaces.

19. The aligning device of claim 14, wherein the laser light generator comprises two laser light sources.

20. The aligning device of claim 14, wherein the housing comprises a triangle with two perpendicular surfaces or a carpenter's level with two parallel surfaces.

21. The aligning device of claim 14, further comprising at least one level indicator.

22. A method of making a laser aligning device that is disposable on a working surface, the method comprising:

providing a housing having at least one outer planar surface that defines a reference plane;

assembling a mirror into the housing;

assembling a laser light source into the housing; and assembling an aiming device inside the housing for aiming at least one of the mirror and the light source, wherein a portion of the laser light reflected from the mirror leaves the laser aligning device in a fan-shaped beam defining a plane that is substantially parallel and immediately adjacent to the reference plane and substantially parallel and immediately adjacent to the working surface when the device is placed on the working surface.

23. The method of claim 22, further comprising assembling a lens into the housing, wherein the lens or the mirrored surface receives the laser light and transmits the laser light to the other of the lens and the mirrored surface, wherein laser light leaves the laser aligning device adjacent the working surface.

24. The method of claim 22, further comprising assembling an aiming device for aiming at least one of the lens and the laser light source.

25. The method of claim 22, further comprising assembling at least one level indicator parallel to or perpendicular to the at least one planar surface.

26. The method of claim 22, further comprising connecting a switch for a power source into the housing.

27. The device of claim 3 wherein the lens has a lens exit surface that is in the reference plane.

28. The device of claim 3 wherein the lens has a concave inlet face and planar exit surface.

29. The device of claim 3 wherein the mirror produces total internal reflection of the laser light.

30. The device of claim 3 wherein the laser light intersects a mirror at an angle of incidence and the aiming device adjusts the angle of incidence.

31. The device of claim 6 wherein the laser light is generated in a second fan-shaped beam that is substantially perpendicular to the working surface.

32. A laser reference device disposable on a working surface, comprising:

a housing having an outer reference surface that defines a reference plane;

a laser light generator mounted within the housing for generating laser light and projecting a fan-shaped laser light beam outside the housing immediately adjacent and substantially parallel to the reference surface; and an aiming device for adjusting a position of the laser light generator, wherein the reference surface is located immediately adjacent the working surface when the device is placed on the working surface, and the laser light beam projects substantially parallel and immediately adjacent to the working surface, wherein the housing comprises a second reference surface perpendicular to the reference surface, the laser light is generated in a second fan-shaped beam that is substantially perpendicular to the working surface, and the second fan-shaped beam diverges in one dimension at an angle of divergence and the second fan-shaped beam is aimed away from the reference surface at approximately one half of the angle of divergence such that an edge of the second fan-shaped beam is parallel to and aligned with the reference surface.

33. The device of claim 22 wherein the laser light is projected substantially within the reference plane.

* * * * *